United States Patent
Lee et al.

(10) Patent No.: US 10,856,109 B2
(45) Date of Patent: Dec. 1, 2020

(54) METHOD AND DEVICE FOR RECORDING PARKING LOCATION

(71) Applicant: LG ELECTRONICS INC., Seoul (KR)

(72) Inventors: Yongsuk Lee, Gimpo-si (KR); Yoonkyum Kim, Seoul (KR); Jongjin Park, Busan (KR); Wonkyum Kim, Seoul (KR); Sung Hyun Park, Seoul (KR); Dong Woo Sohn, Gimpo-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/584,885

(22) Filed: Sep. 26, 2019

(65) Prior Publication Data

US 2020/0120450 A1    Apr. 16, 2020

Related U.S. Application Data

(60) Provisional application No. 62/808,789, filed on Feb. 21, 2019.

(30) Foreign Application Priority Data

Apr. 12, 2019   (WO) ................ PCT/KR2019/004470

(51) Int. Cl.
*H04W 24/00*   (2009.01)
*H04W 4/029*   (2018.01)
(Continued)

(52) U.S. Cl.
CPC .......... *H04W 4/029* (2018.02); *H04B 17/318* (2015.01); *H04M 1/72569* (2013.01); *H04W 4/027* (2013.01); *H04W 4/48* (2018.02)

(58) Field of Classification Search
CPC ..... H04W 4/024; H04W 4/027; H04W 4/029; H04W 4/44
(Continued)

(56) References Cited

U.S. PATENT DOCUMENTS

| 6,186,537 B1 * | 2/2001 | Breed .................... B60N 2/002 280/735 |
| 2007/0016364 A1 * | 1/2007 | Lee .......................... G08G 1/14 701/408 |

(Continued)

FOREIGN PATENT DOCUMENTS

| KR | 1020040110888 | 12/2004 |
| KR | 1020060081844 | 7/2006 |

(Continued)

OTHER PUBLICATIONS

PCT International Application No. PCT/KR209/004470, International Search Report dated Nov. 21, 2019, 2 pages.

*Primary Examiner* — Joseph Arevalo
(74) *Attorney, Agent, or Firm* — Lee, Hong, Degerman, Kang & Waimey

(57) ABSTRACT

The present disclosure relates to a method and device for recording a parking location of a vehicle more accurately at a more accurate time point by performing machine learning through situation recognition by the device. A method for recording parking according to an embodiment of the present disclosure includes, when a communication is established between the terminal and the vehicle, recognizing that a user gets in the vehicle, when a strength of a communication connection signal between the terminal and the vehicle is lowered to be equal to or lower than a predetermined level, recognizing that the user exits the vehicle, when it is determined by the motion sensor of the terminal that the user has moved a predetermined number of walking (Continued)

steps or more, recognizing that parking of the vehicle is completed.

16 Claims, 14 Drawing Sheets

(51) Int. Cl.
  *H04B 17/318* (2015.01)
  *H04W 4/48* (2018.01)
  *H04M 1/725* (2006.01)
  *H04W 4/02* (2018.01)

(58) Field of Classification Search
  USPC .......................................... 455/456.3, 456.1
  See application file for complete search history.

(56) References Cited

U.S. PATENT DOCUMENTS

| | | | | |
|---|---|---|---|---|
| 2010/0225461 | A1* | 9/2010 | Tuli | G01S 3/8036 340/436 |
| 2012/0123649 | A1* | 5/2012 | Eggers | E05F 15/77 701/49 |
| 2013/0265178 | A1* | 10/2013 | Tengler | G08G 1/091 340/989 |
| 2014/0309870 | A1* | 10/2014 | Ricci | G05D 23/1917 701/36 |
| 2014/0375804 | A1* | 12/2014 | Bulan | G08G 1/04 348/148 |
| 2015/0350413 | A1* | 12/2015 | Ma | H04M 1/7253 455/418 |
| 2017/0153714 | A1* | 6/2017 | Gao | G06K 9/00805 |
| 2017/0192086 | A1* | 7/2017 | Hamada | H04B 17/318 |
| 2017/0240185 | A1* | 8/2017 | Li | B60W 40/08 |
| 2017/0358208 | A1* | 12/2017 | Kazemi | H04W 4/44 |
| 2018/0050662 | A1* | 2/2018 | Sanji | H04B 17/318 |
| 2018/0053416 | A1* | 2/2018 | Sanji | G07C 9/00309 |
| 2018/0058967 | A1* | 3/2018 | Jang | G01L 19/086 |
| 2018/0137735 | A1* | 5/2018 | Matsuoka | G16H 50/20 |
| 2018/0146343 | A1* | 5/2018 | Lee | G06F 3/147 |
| 2018/0232639 | A1* | 8/2018 | Lin | G06N 3/063 |
| 2018/0357484 | A1* | 12/2018 | Omata | G06K 9/00818 |
| 2019/0068899 | A1* | 2/2019 | Wada | H04N 7/183 |
| 2019/0072638 | A1* | 3/2019 | Wang | H04W 4/029 |
| 2019/0096252 | A1 | 3/2019 | Tucker et al. | |
| 2019/0100145 | A1* | 4/2019 | Chen | B60K 35/00 |
| 2019/0139411 | A1* | 5/2019 | Dhull | H04N 7/188 |
| 2019/0158730 | A1* | 5/2019 | Ejiri | G03B 17/02 |
| 2019/0265868 | A1* | 8/2019 | Penilla | B60N 2/0228 |
| 2019/0291538 | A1* | 9/2019 | Miura | B60H 3/0035 |
| 2019/0325585 | A1* | 10/2019 | Kakita | G06K 9/00791 |
| 2019/0329729 | A1* | 10/2019 | Hilligardt | G06K 9/00805 |

FOREIGN PATENT DOCUMENTS

| | | |
|---|---|---|
| KR | 1020070111752 | 11/2007 |
| KR | 1020120058281 | 6/2012 |
| KR | 1020180104272 | 9/2018 |
| WO | 2014130194 | 8/2014 |

\* cited by examiner

FIG. 3

| SITUATION | RECOGNITION INFORMATION | USED TECHNOLOGIES | USED INFORMATION |
|---|---|---|---|
| (1) | ON-BOARD RECOGNITION | COMMUNICATION ESTABLISHMENT<br>BLUETOOTH<br>ANDROID AUTO<br>MIRRORLINK | CONNECTION BETWEEN TERMINAL AND VEHICLE |
| (2) | TRAVELLING RECOGNITION | SENSOR<br>QUALCOMM CMC<br>ANDROID AR | SENSING OF TRAVELLING MOVEMENT |
| (3) | OFF-BOARD RECOGNITION | COMMUNICATION ESTABLISHMENT<br>BLUETOOTH<br>ANDROID AUTO<br>MIRRORLINK | RELEASE OF CONNECTION BETWEEN TERMINAL AND VEHICLE, OR RSSI OF CONNECTION SIGNAL |
| (4) | PARKING RECOGNITION | SENSOR<br>QUALCOMM CMC<br>ANDROID AR<br>PEDOMETER | SENSING OF WALKING MOVEMENT |

METHOD AND DEVICE FOR RECORDING PARKING LOCATION

CROSS-REFERENCE TO RELATED APPLICATION

Pursuant to 35 U.S.C. § 119, this application claims the benefit of U.S. Provisional Patent Application No. 62/808,789, filed on Feb. 21, 2019, and also claims the benefit of earlier filing date and right of priority to International Application No. PCT/KR2019/004470, filed on Apr. 12, 2019, the contents of which are all hereby incorporated by reference herein in their entireties.

BACKGROUND

1. Technical Field

The present disclosure relates to a method and device for recording a parking location. More specifically, the present disclosure relates to a method and device for recording a parking location, which can automatically recognize a vehicle operation situation, can help a user easily find a parking space later by using a record formed through location, image, voice, or text information, and can provide a more accurate parking location even in a place where it is difficult to obtain a location.

2. Description of Related Art

The description below is merely for the purpose of providing background information relating to embodiments in the present disclosure and does not naturally forms a prior art.

In order to do business outside a vehicle after driving the vehicle to a destination, the vehicle needs to be parked at a particular location. When a person parks his/her vehicle in a large parking lot in a large shopping center, a parking building, an apartment, or the like, which has multiple floors and a wide space on every floor, it is hard for the person to find the location where his/her vehicle is parked, after passage of time.

In this regard, a parking lot number, etc. is marked on a parking space. However, many people who have to move to do their work after parking are apt to leave without recording a corresponding parking lot number and leave the parking space.

U.S. patent Publication Ser. No. US2019/0096252A discloses a "METHOD FOR LOCATING A VEHICLE", wherein sensors are additionally installed in parking spaces in a parking structure, a server is disposed to be connected to the sensors and provide parking space information, and a portable computing device receives and records location information relating to where a vehicle is parked, by communicating with sensors around the parked vehicle.

However, in the "METHOD FOR LOCATING A VEHICLE", the sensors and the server for providing parking space information are required to be additionally installed in the parking structure. Therefore, the method is problematic in that additional costs for installation and maintenance of the parking facility are incurred.

In addition, in the "METHOD FOR LOCATING A VEHICLE", in order to determine whether the vehicle has been parked, it is required to determine whether the engine of the vehicle has been turned off, whether the gear of the vehicle is in the position of park (P), whether the parking brake has been set, and whether a predetermined time has passed after the vehicle is stopped.

In the method described above, in which only a particular momentary situation, instead of the entire contextual situation, is considered in determining whether the vehicle has been parked, a situation, which is not usual but happens sometimes, where a driver momentarily gets in the vehicle, idles the vehicle, then turns off the engine, and sets the parking brake, may be misdetermined as a parking situation, and thus the location of the parked vehicle is unnecessarily sensed and recorded again.

WO patent publication number WO2014/130194A, entitled "AUTOMATIC IDENTIFICATION OF VEHICLE LOCATION", proposes a method using a mobile device to identify the location at which a vehicle is parked is proposed. The disclosed publication employs a method of, when a communication is established between the vehicle and the mobile device and then the communication is disconnected, determining the vehicle in a parked state and identifying the location of the mobile device, thereby automatically sensing the location of the parked vehicle.

However, in the "AUTOMATIC IDENTIFICATION OF VEHICLE LOCATION", the establishment and disconnection of the communication between the mobile device and the vehicle are taken as main clues for determining a parking situation. Therefore, a case where a user momentarily gets in the vehicle, a communication is established between the vehicle and the mobile device, and then the user turns off the engine of the vehicle, is also determined as the vehicle being parked, so that even through there is no change in situation, a parked situation is unnecessarily recorded again.

In addition, in the "AUTOMATIC IDENTIFICATION OF VEHICLE LOCATION", in relation to identification of the location of the vehicle, a method of, when a location information signal, such as GPS, is weakened, using sensor data of the mobile device to sense the movement so as to estimate the location of the vehicle is disclosed. However, in the method, when there is an error in a location information signal, the location of the vehicle may be misdetermined to be a location completely different from the actual location thereof.

Therefore, a method for allowing more accurate recognition of a parked state of a vehicle, recording the parking location only when the recoding thereof is required, and enabling the location to be more accurately identified while being less affected by an incorrect location information signal is required.

SUMMARY OF THE INVENTION

An aspect of the present disclosure is to provide a method and device for recording a parking location, wherein a user can identify the parking location of a vehicle by using a mobile device usually carried by the user, without additional equipment in the vehicle and a parking facility.

An aspect of the present disclosure is to provide a method and device, which can more accurately recognize a parking situation requiring recording, through contextual situation recognition and situation determination considering various factors, in order to solve the problem of the case where even through a vehicle does not enter a parked state requiring recording of a vehicle location, parking is incorrectly recognized and a parked state is determined unnecessarily or inaccurately, whereby an unnecessary and incorrect service is provided.

An aspect of the present disclosure is provide to a method and device which enable a user to make a record relating to parking information when have recognized an accurate parking situation, in order to prevent occurrence of a situation where, after parking has been performed, a user forgets to record a parking location and fails to find the accurate parking location without information relating to the parking location later.

An aspect of the present disclosure is to provide a method and device, which enable identification of the location of even a vehicle parked at a place where it is difficult to obtain location information, in order to solve the problem, relating to providing of location information of a vehicle to be parked, which is that the parking location of the vehicle cannot be identified at a place, such as an indoor facility, where it is difficult to obtain location information.

An aspect of the present disclosure is to provide a method and device which can automatically discern between location information with an error and accurate location information and provide more accurate location information in order to solve the problem that when there is an error in location information, on which the identification of a parking location may be based, an incorrect parking location may be provided.

In accordance with the above aspects, an embodiment in the present disclosure may provide a method for recording a parking location of a vehicle, wherein various factors and the context of a situation are considered, a driver off-board situation and a parking situation are separately recognized, whereby a situation, in which parking is completed, requiring recording of a vehicle location is more accurately recognized, parking is recorded only if needed, and a recording request is generated to allow a user to record parking information without omission.

A method for recording a parking location of a vehicle according to an embodiment of the present disclosure may include: an on-board recognition step of, when a communication is established between the user terminal and the vehicle, recognizing that a user gets in the vehicle; a traveling recognition step of recognizing, by a motion sensor of the terminal, that the vehicle, which the user of the terminal gets into, starts to travel; an off-board recognition step of, when a strength of a communication connection signal between the terminal and the vehicle is lowered to be equal to or lower than a predetermined level, recognizing that the user gets out of the vehicle; a parking recognition step of, when it is determined by the motion sensor of the terminal that the user has moved on foot by a predetermined number of walking steps or more, recognizing that parking of the vehicle is completed; and a parking information request step of, when it is recognized that the parking of the vehicle is completed, requesting an input of parking information from the user through a user interface of the terminal.

A method for recording a parking location of a vehicle according to an embodiment of the present disclosure may include a parking card generation step of generating a parking information card at least partially on the basis of the parking information input in the parking information request step.

A method for recording a parking location of a vehicle according to an embodiment of the present disclosure may further include, after the off-board recognition step, a location measurement step of measuring a current location of the terminal to decide location information of the terminal, wherein the parking card generation step may include generating the parking information card on the basis of the parking information input in the parking information request step and the location information decided in the location measurement step.

The measuring of the location in the location measuring step may be repeatedly performed according to a predetermined period within a predetermined range of time after the off-board recognition step, and the location information of the terminal in the location measurement step may be obtained using at least one of base station information relating to a base station connected to the terminal, WiFi network information relating to a WiFi network connected to the terminal, or GNSS signal information relating to a GNSS signal obtained by the terminal.

The location information may include latitude, longitude, and location accuracy, and the location accuracy may indicate an error range of the location information with a distance unit.

A method for recording a parking location of a vehicle according to an embodiment of the present disclosure may include determining inaccurate or abnormal pieces of location information among measured pieces of location information to exclude the inaccurate or abnormal pieces of location information in a location deciding procedure.

When the location accuracy of the location information measured in the location measurement step is equal to or greater than a predetermined distance value, the corresponding location information may be determined as an inaccurate location and may be excluded from the measured location information In a method for recording a parking location of a vehicle according to an another embodiment of the present disclosure, the location measurement step may include: before the off-board recognition step, obtaining first location information, which is last GNSS (Global Navigation Satellite System) location information before off-boarding, on the basis of a GNSS signal lastly obtained by the terminal; obtaining current location information of the terminal after the off-board recognition step; and comparing the current location information and the first location information, and when a distance from a current location to a first location is equal to or greater than a predetermine value, determining the current location information as an abnormal location.

In a method for recording a parking location of a vehicle according to a yet another embodiment of the present disclosure, the location measurement step may include: before the off-board recognition step, obtaining first location information, which is last GNSS (Global Navigation Satellite System) location information before off-boarding, on the basis of a GNSS signal lastly obtained by the terminal; generating a first group including the first location information; obtaining current location information of the terminal after the off-board recognition step; calculating distances from a current location to existing locations by comparing the current location information and pieces of existing location information; when a smallest value among values of the distances from the current location to the existing locations is greater than a pre-configured value, generating a new group including the current location information, and when the smallest value among the values of the distances from the current location to the existing locations falls within the pre-configured range, including the current location information in a closest group to which a closest existing location, which is closest to the current location, belongs; and when a number of pieces of location information included in the closest group is equal to or greater than a predetermined number, and accuracy of at least one piece of location information among the pieces of location information included in the closest group is equal to or greater than a predetermined level, terminating the location measurement and providing, as the decided location information, location information having a highest accuracy among the pieces of location information included in the closest group, and when the number is smaller than the predetermined number and the accuracy is smaller than the predetermined level, repeating the above steps, wherein the pieces of existing location information may include the first location information and pieces of location information of the terminal measured after the off-board recognition step.

A computer-readable recording medium according to a yet another embodiment of the present disclosure may be a computer-readable recording medium in which at least a program configured to, when executed by a user terminal, cause the terminal to perform the method for recording a parking location described above.

A device configured to record a parking location of a vehicle according to a yet another embodiment of the present disclosure may include: a motion sensor configured to sense movement of the device; a communication module configured to perform communication with an external device; a user interface configured to allow a user and the device to interact with each other; and a processor configured to interact with the motion sensor, the communication module, and the user interface.

The processor may be configured to: A) when a communication is established between the communication module and the vehicle, recognize that the user gets in the vehicle; B) when the device moves at a predetermined speed or higher, recognize, by the motion sensor, that the vehicle starts to travel; C) when a strength of a communication connection signal between the communication module and the vehicle is lowered to be equal to or lower than a predetermined level, recognize that the user gets out of the vehicle; D) when it is determined by the motion sensor that the user carrying the device has moved on foot by a predetermined number of walking steps or more, recognize that parking of the vehicle is completed; E) request an input of parking information from the user through the user interface of the device; and F) after the parking information input request, generate a parking information card at least partially on the basis of the parking information input through the user interface.

The processor may be configured to perform E) and F) after all of A) to D) are completed in sequence.

In a device configured to record a parking location of a vehicle according to a yet another embodiment of the present disclosure, the processor may be further configured to, after C), perform a location measurement operation of measuring a current location of the device to decide location information of the device, wherein the parking information card may be generated on the basis of the parking information input through the user interface and the location information decided in the location measurement operation.

The processor may be further configured to repeatedly perform the location measurement operation according to a predetermined period within a predetermined range of time after C).

The communication module may include a GNSS module, and the location information of the device in the location measurement operation may be obtained using at least one of base station information relating to a base station connected to the device, WiFi network information relating to a WiFi network connected to the device, or GNSS signal information relating to a GNSS signal obtained by the device.

The location information may include latitude, longitude, and location accuracy, and the location accuracy may indicate an error range of the location information with a distance unit.

In a device configured to record a parking location of a vehicle according to a yet another embodiment of the present disclosure, when the location accuracy of the location information measured in the location measurement operation is equal to or greater than a predetermined distance value, the corresponding location information may be determined as an inaccurate location and may be excluded from the measured location information.

In a device configured to record a parking location of a vehicle according to a yet another embodiment of the present disclosure, the communication module may include a GNSS module, and the location measurement operation may include: before C), obtaining first location information, which is last GNSS (Global Navigation Satellite System) location information before off-boarding, on the basis of a GNSS signal lastly obtained by the device; obtaining current location information of the device after C); and comparing the current location information and the first location information, and when a distance from a current location to a first location is equal to or greater than a predetermine value, determining the current location information as an abnormal location.

The communication module may include a GNSS module, and the location measurement operation may include: a) before C), obtaining first location information, which is last GNSS (Global Navigation Satellite System) location information before off-boarding, on the basis of a GNSS signal lastly obtained by the device; b) generating a first group including the first location information; c) obtaining current location information of the device after the off-board recognition; d) calculating distances from a current location to existing locations by comparing the current location information and pieces of existing location information; e) when a smallest value among values of the distances from the current location to the existing locations is greater than a pre-configured value, generating a new group including the current location information, and when the smallest value among the values of the distances from the current location to the existing locations falls within the pre-configured range, including the current location information in a closest group to which a closest existing location, which is closest to the current location, belongs; and f) when a number of pieces of location information included in the closest group is equal to or greater than a predetermined number, and accuracy of at least one piece of location information among the pieces of location information included in the closest group is equal to or greater than a predetermined level, terminating the location measurement and providing, as the decided location information, location information having a highest accuracy among the pieces of location information included in the closest group, and when the number is smaller than the predetermined number and the accuracy is smaller than the predetermined level, repeating c) to e).

The pieces of existing location information may include the first location information and pieces of location information of the device, which is measured after C).

Embodiments in the present disclosure can provide a method and device for recording a parking location, wherein a user can more accurately identify, only if needed, the parking location of a vehicle by using a mobile device usually carried by the user, without additional equipment in the vehicle and a parking facility.

Embodiments in the present disclosure can provide a method and device, which can more accurately recognize a parking situation requiring recording, through contextual situation recognition and situation determination considering various factors.

According to embodiments in the present disclosure, a user can be prevented, after parking has been performed, from forgetting to record a parking location and moving far away from the vehicle, and can make a record relating to parking information when an accurate parking situation is recognized.

Embodiments in the present disclosure can provide a method and device which can identify a relatively accurate location of a vehicle parked even at a place where it is difficult to obtain location information.

Embodiments in the present disclosure can provide a method and device, which can automatically discern location information with an error and accurate location information and provide more accurate location information when a parking location is identified.

BRIEF DESCRIPTION OF THE DRAWINGS

The above and other aspects, features, and advantages of the present disclosure will become apparent from the detailed description of the following aspects in conjunction with the accompanying drawings, in which:

FIG. 3 is a diagram illustrating situations from on-boarding to parking, and technologies and information used for recognizing the situations according to an embodiment in the present disclosure;

DETAILED DESCRIPTION

Hereinafter, the disclosure will be described in detail with reference to the accompanying drawings. The disclosure may be implemented in various different forms and is not limited to embodiments described herein. In order to explain the present disclosure clearly, the embodiments described below may omit portions, which do not have a direct relationship with the explanation, but it does not mean that the omitted configurations are unnecessary to implement a device or a system to which the idea of the present disclosure is applied. The same or similar components are indicated by the same reference number throughout the description.

Although the terms "first", "second", and the like may be used to describe various components, the components should not be defined by the terms, and the terms are used only for the purpose of distinguishing between one component and the other components. As used herein, the singular forms are intended to include the plural forms as well, unless the context clearly indicates otherwise.

In the description, it should be understood that the terms "include" or "have" indicate existence of a feature, a number, a step, an operation, a component, parts, or a combination thereof, and do not previously exclude the existences or probability of addition of one or more other features, numerals, steps, operations, components, parts, or combinations thereof.

Figure 1:
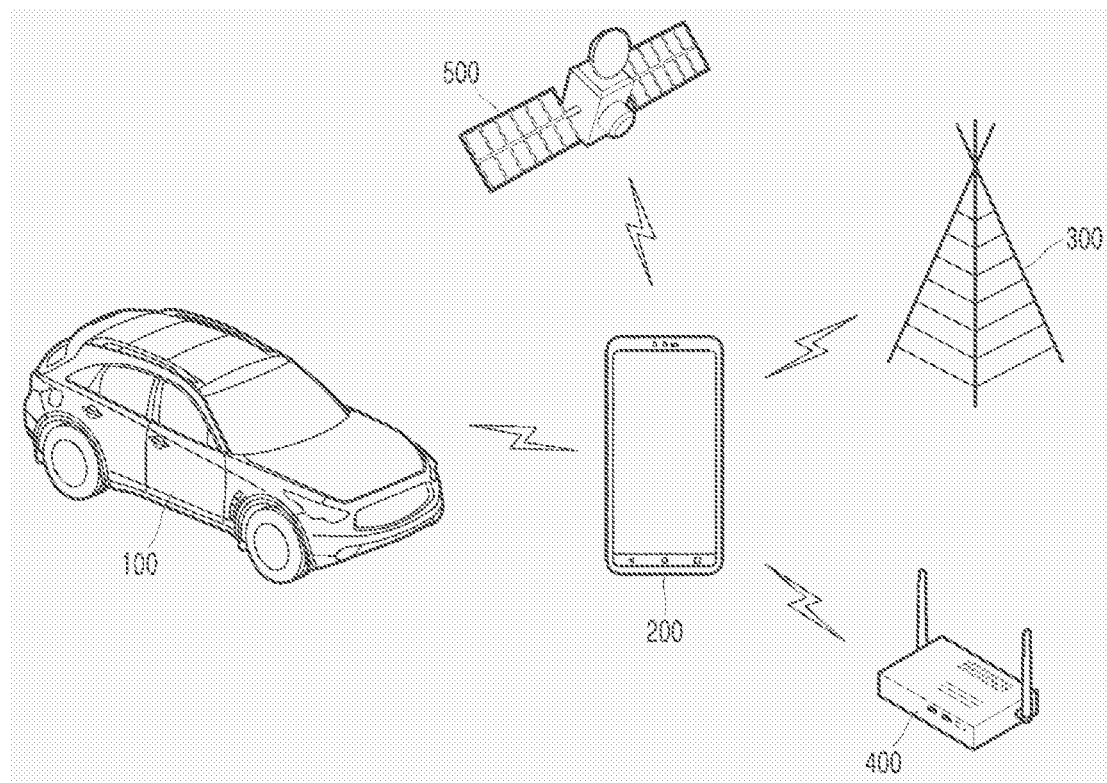
FIG. 1 illustrates an environment for implementing a method for recording a parking location according to an embodiment in the present disclosure.

FIG. 1 illustrates an environment for implementing a method for recording a parking location according to an embodiment in the present disclosure.

Elements for recording the parking location of a vehicle may include: a user terminal 200; a vehicle 100 configured to communicate with the user terminal 200; a Global Navigation Satellite System (GNSS) signal transmitter 500; a base station 300; and a wireless access point 400.

The user terminal 200 may be a mobile device which a user can move while holding, and may be one of various devices, such as a smartphone, a tablet PC, a smart watch, a notebook, and a PDA.

The user terminal 200 may be connected to the vehicle 100 through wired/wireless communication. For example, a communication may be established between the user terminal 200 and the vehicle 100 through Bluetooth as a wireless communication, and a communication may be established between the user terminal 200 and the vehicle 100 through USB connection, as a wired communication.

The user terminal 200 and the vehicle 100 may be connected through an interface, such as an Android Auto, Apple CarPlay, and Mirrorlink.

The user terminal 200 may communicate with the base station 300, which is a wireless communication facility that can connect a network and the terminal. The base station 300 may connect the user terminal 200 and an access network of a mobile communication, such as CDMA, GSM, WCDMA, LTE, and 5th generation mobile communication (5G).

The location of the user terminal 200 may be approximately determined on the basis of which base station 300 the user terminal 200 communicates with.

The user terminal 200 may communicate with the access point 400, which allows connection to a network through WiFi. The location of the user terminal 200 may be determined on the basis of information of the access point 400 connected to the user terminal 200, or information of a WiFi network.

The user terminal 200 may communicate with the GNSS signal transmitter 500, such as GPS satellite. GNSS is a system that provides information relating to the location, altitude, speed of an object on the ground by using an artificial satellite flying in space orbit, and may communicate with the user terminal 200 to provide information relating to the location, altitude, speed of the user terminal 200.

The GNSS may include a Global Positioning System (GPS), a GLObal NAvigation Satellite System (GLONASS)

developed by Russia, Galileo developed by the European Union, Beidou developed by China, etc.

The user terminal 200 may determine a user boarding/exiting the vehicle 100 by using the establishment and disconnection of a communication with the vehicle 100 and may measure the location of the user terminal 200 by communicating with the base station 300, the access point 400, and the GNSS signal transmitter 500.

Figure 2:
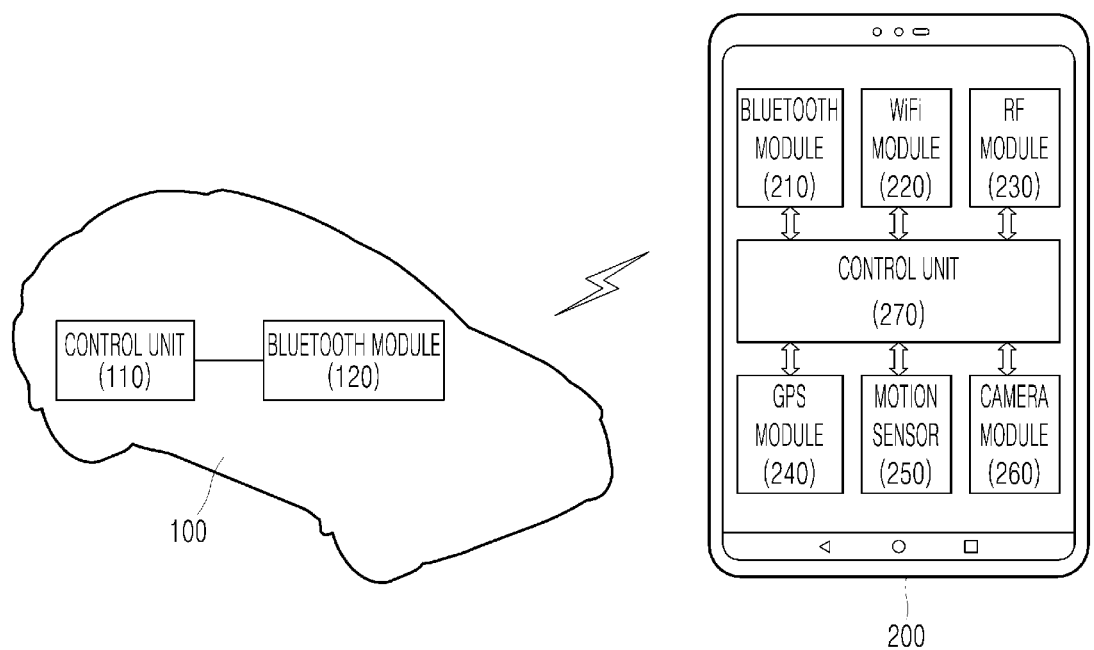
FIG. 2 illustrates a block diagram of a vehicle and a user terminal according to an embodiment in the present disclosure.

FIG. 2 illustrates a block diagram of a vehicle and a user terminal according to an embodiment in the present disclosure.

In an embodiment of the present disclosure, a vehicle 100 may include a Bluetooth module 120 mounted therein and include a control unit 110, which can control various electronic devices of the vehicle, including the Bluetooth module 120.

A user terminal (200) according to an embodiment of the present disclosure may include a Bluetooth module 210, a WiFi module 220, and an RF module 230 in order to communicate with an external device. The user terminal 200 may include a GPS module 240, which can receive location information from a GPS satellite, a motion sensor 250, which can sense various movements of the user terminal 200, a camera module 260, which can take an image of an external environment, and a control unit 270, which can control the operation thereof.

A communication between the Bluetooth module 210 of the user terminal 200 and the Bluetooth module 120 of the vehicle 100 can be established through device setup therebetween. Each of the user terminal 200 and the vehicle 100 may include an identification record of the other in a Bluetooth connection profile at the time of an initial device setup.

At every time when the user terminal 200 is connected to the vehicle 100 through a connection profile including an identification record of the vehicle 100, the user terminal 200 can recognize that a communication has been established between the user terminal and the vehicle.

Using the recognition process, the user terminal 200 may recognize a case when the user terminal 200 is placed in the vehicle, that is, a situation where a user carrying the user terminal 200 gets in the vehicle 100. The user terminal 200 may recognize, as the situation where a user carrying the user terminal 200 gets out of the vehicle 100, that the vehicle 100 is turned off or the user terminal 200 is moved outside the vehicle, whereby the communication is disconnected or the strength of a connection signal is weakened at a predetermined level or less.

The WiFi module 220 of the user terminal 200 may communicate with the access point 400 located at close range, and the user terminal 200 may measure a place at which the user terminal 200 is located, through the IP address of the access point 400, or the like.

The RF module 230 of the user terminal 200 may communicate with the base station 300 and may allow estimation of a region in which the user terminal 200 is placed, through location information of the base station 300, with which the user terminal 200 communicates with.

The motion sensor 250 of the user terminal 200 may include a sensor, such as an acceleration sensor and a gyroscope. The user terminal 200 may determine whether a user carrying the user terminal 200 has stopped, is walking, is running, is riding a bicycle, or is on-board a vehicle, which is traveling, by using a Qualcomm CMC (Coarse Motion Classifier) or Android AR(Activity Recognition) together with the motion sensor 250.

The Qualcomm CMC is a context awareness API provided by Qualcomm and is configured to provide Walk, Run, Bike, Stationary, and Vehicle information by using sensor information of a mobile device. The Google AR is a context awareness API provided by Google and is configured to provide IN_VEHICLE, ON_BICYCLE, ON_FOOR, and RUNNING information by using sensor information of the mobile device.

The camera module 260 of the user terminal 200 is configured to take an image of an external situation so as to enable a user to take an image of the location of the parked vehicle and store the image.

FIG. 3 is a diagram illustrating situations ranging to parking and technologies and information used for recognizing the situations according to an embodiment in the present disclosure.

In situation (1) in FIG. 3, a user gets in a vehicle 100 with a user terminal 200. When the user terminal 200, in which Bluetooth is on and a configuration for connection to the vehicle 100 has been set up, is moved in the vehicle 100, the user terminal 200 is connected to the vehicle 100 automatically, and may recognize the connection to the vehicle 100, through a profile of a connected Bluetooth device.

The connection of the user terminal 200 to the vehicle 100 means that the user carrying the user terminal 200 is on-board the vehicle 100. Therefore, when a communication between the user terminal 200 and the vehicle 100 is established, the user terminal 200 may recognize that the user is on-board the vehicle 100.

Information used for on-board recognition is a connection between the user terminal 200 and the vehicle 100, and the connection may be formed through a communication establishment technology, such as Bluetooth, Android-Auto, and Mirrorlink.

In situation (2) in FIG. 3, the vehicle 100, which has the user on-board, starts to travel. In the traveling vehicle 100, there is the user terminal 200, and the user terminal 200 may sense a traveling movement of the vehicle through a motion sensor and an API, such as a Qualcomm CMC and Android AR.

In order to decide parking recognition later, traveling recognition is an essential step. Even in the case where the on-board recognition described above and off-board recognition described below are accomplished, when traveling recognition between the on-board recognition and the off-board recognition is not identified, the non-identification of traveling recognition means that the vehicle has not been moved, and thus there is no need to newly record a parking location.

In situation (3) in FIG. 3, when the vehicle 100 arrives at a destination, the vehicle is turned off and the communication between the vehicle 100 and the user terminal 200 is disconnected. Therefore, when the communication between the vehicle 100 and the user terminal 200 is disconnected, the disconnection can be recognized as a situation where the user gets out of the vehicle 100.

Even when the vehicle is turned off, a Bluetooth module of the vehicle 100 is being supplied with power by a battery, etc. Therefore, Bluetooth connection between the user terminal 200 and the vehicle 100 may be maintained during a certain time after the vehicle is turned off.

Therefore, in addition to the case where the connection between the user terminal 200 and the vehicle 100 is completely released, when the user terminal 200 becomes far away from the vehicle 100 and the strength of a connection signal between the user terminal 200 and the vehicle 100 is weakened at "a predetermined level" or less, off-board recognition may be accomplished. The situation where the strength of the connection signal is weakened at "the predetermined level" or less includes a case where the connection is released.

Figure 4:
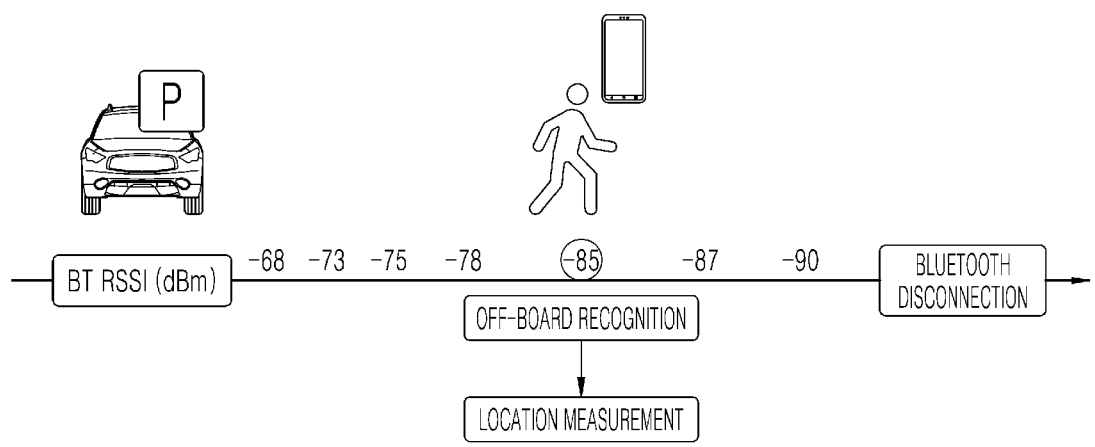
FIG. 4 is a diagram illustrating a condition for off-board recognition according to an embodiment in the present disclosure.

FIG. 4 illustrates that when the user starts to get out of the vehicle 100, the strength of a Bluetooth signal of the user terminal 200 connected to the vehicle 100 is weakened. When the user gets out and moves far away from the vehicle 100, the Bluetooth RSSI of the user terminal 200 gradually decreases.

For example, in an embodiment in the present disclosure, in the case where "the predetermined level" is configured as −85 dBm, when the user moves far away from the vehicle 100 and thus the Bluetooth RSSI of the user terminal 200 is lowered to −85 dBm, the user terminal 200 recognizes an off-board situation. "The predetermined level" may be pre-configured to be different according to embodiments.

When the user terminal 200 recognizes that the user gets out of the vehicle, the user terminal measures the location thereof to identify the location of the stopped vehicle.

Referring again to FIG. 3, after the off-board recognition is completed, the user terminal 200 determines whether the user moves on foot by a predetermined number of steps or more, through the motion sensor 250 of the user terminal 200.

When the user has moved on foot by a predetermined number of steps or more, for example, five steps or more, it indicates that the user has got off the vehicle 100 and is moving on foot to another place. Therefore, the user terminal may recognize that parking has been performed.

The walking movement of the user may be sensed by a motion sensor, APIs such as Qualcomm CMC and Android AR, and also a general pedometer.

The fact that the user has moved on foot by a predetermined number of steps or more indicates that the user is moving away from the vehicle 100. Therefore, in addition to the off-board recognition, the user terminal 200 additionally determines whether walking is sensed, whereby a parking situation can be more accurately recognized.

In a case where there is no parking recognition operation using sensing of walking and whether parking has been performed is determined only on the basis of off-board recognition described above, even when the user temporarily stops the vehicle for filling with fuel, turns off the vehicle, and then sits in the vehicle, parking may be recognized incorrectly.

However, an embodiment in the present disclosure employs a fact that the user has moved on foot by a predetermined number of steps or more, as an additional condition for recognizing that parking has been performed, which is to be identified after off-board recognition, whereby a parking situation can be more accurately recognized.

That is, in an embodiment of the present disclosure, when on-board recognition, traveling recognition, off-board recognition, and parking recognition are all accomplished in consideration of the entire contextual situation ranging to a parking operation rather than as a fragmentary event, it is determined that parking of the vehicle 100 is completed. Therefore, a parking situation can be more accurately recognized. The situation recognitions may be configured such that as usage data of the user are stacked, the accuracy is further developed through use patterns analysis using machine learning.

Figure 5:
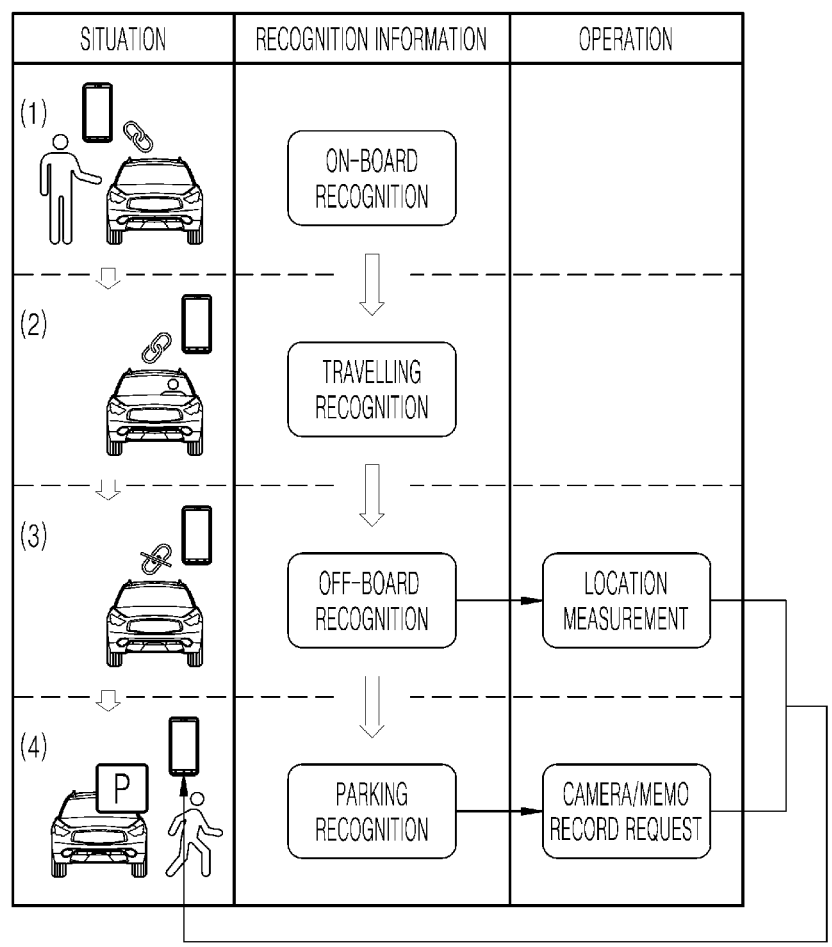
FIG. 5 is a diagram illustrating operations performed by recognition of situations according to an embodiment in the present disclosure.

FIG. 5 is a diagram illustrating operations performed by recognition of situations according to an embodiment in the present disclosure.

In an embodiment of the present disclosure, when off-board recognition is accomplished in the user terminal, it may be required that a current location of the user terminal 200 is measured. When it is recognized that parking of the vehicle 100 is completed, a camera or memo record request may be made using a user interface of the user terminal 200, and the user may be requested to input parking information.

In an embodiment of the present disclosure, when the user performs an input of parking information, for example, photographing a place where the vehicle 100 is parked, recording the location of the place in texts, and recording the location of the place by voice, the input information may be combined with measured location information so as to be used to generate a parking information card.

FIGS. 6 to 10 illustrate exemplary screens which may be displayed on a user terminal when the operations illustrated in FIG. 5 are performed.

Figure 6:
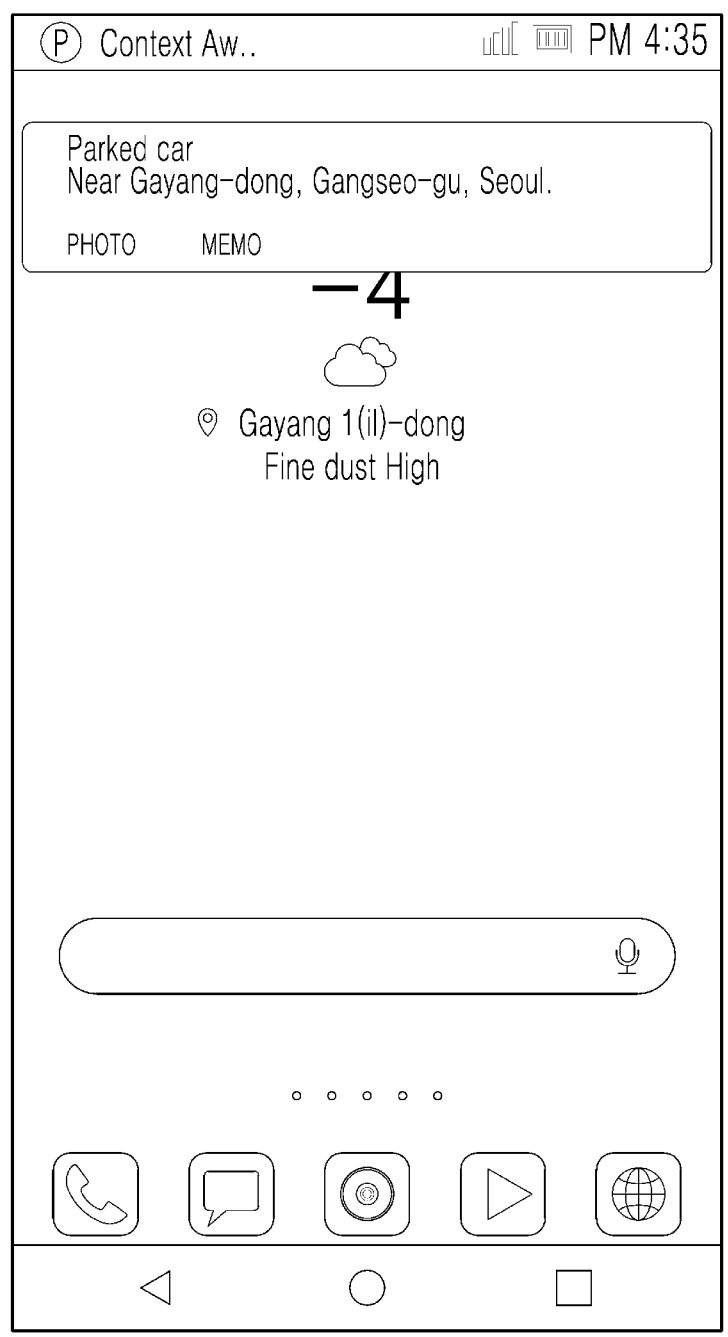
FIGS. 6 to 10 illustrate exemplary screens which may be displayed on a user terminal when the operations illustrated in FIG. 5 are performed.

FIG. 6 is an example of a screen requesting an input of parking information from the user after parking recognition. The box at the top of the user terminal 200 shows location information of a place where the vehicle is parked, obtained by a location measurement, and allows the user to select whether to photograph the parking location or record the parking location by making a memo thereof.

Figure 7:
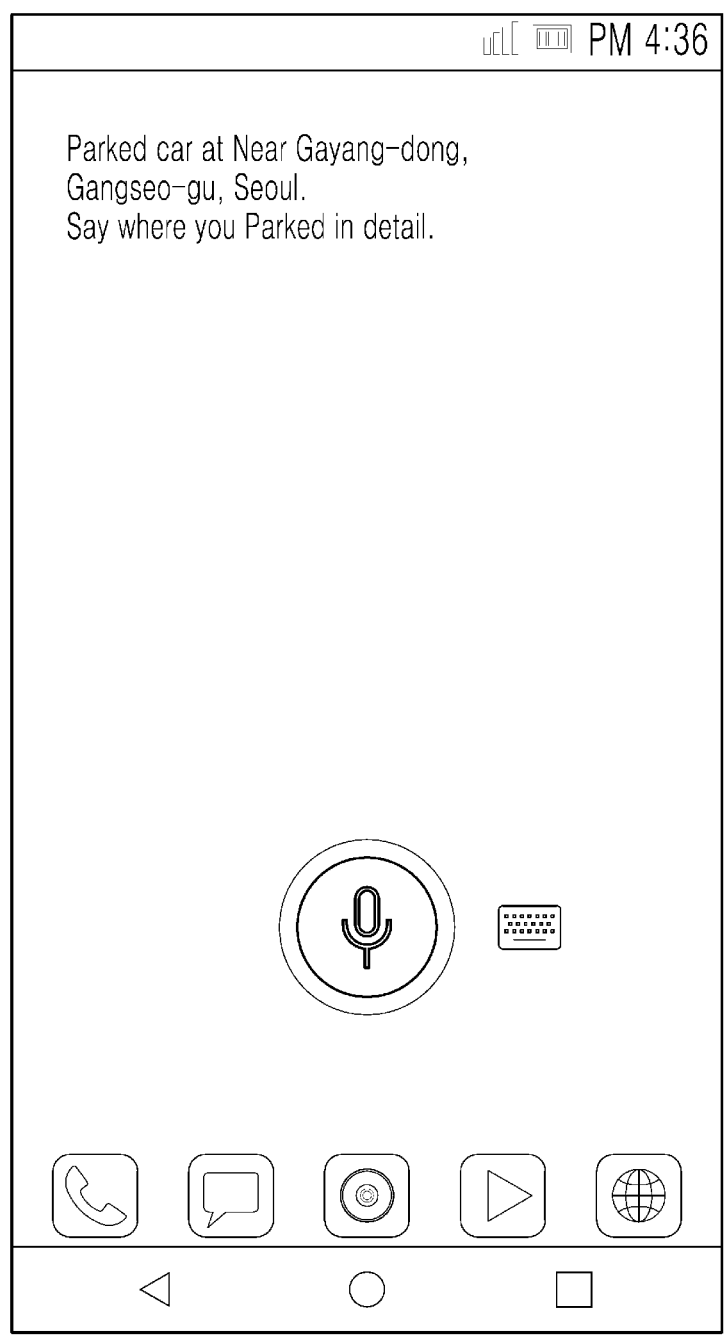

FIG. 7 is an example of an interface screen allowing a user to make a memo in voice or text when the user selects a MEMO button. At the top of the user terminal 200, the location information of the place where the vehicle is parked, obtained by the location measurement, is showed, and a microphone button and a keyboard button are provided.

Figure 8:
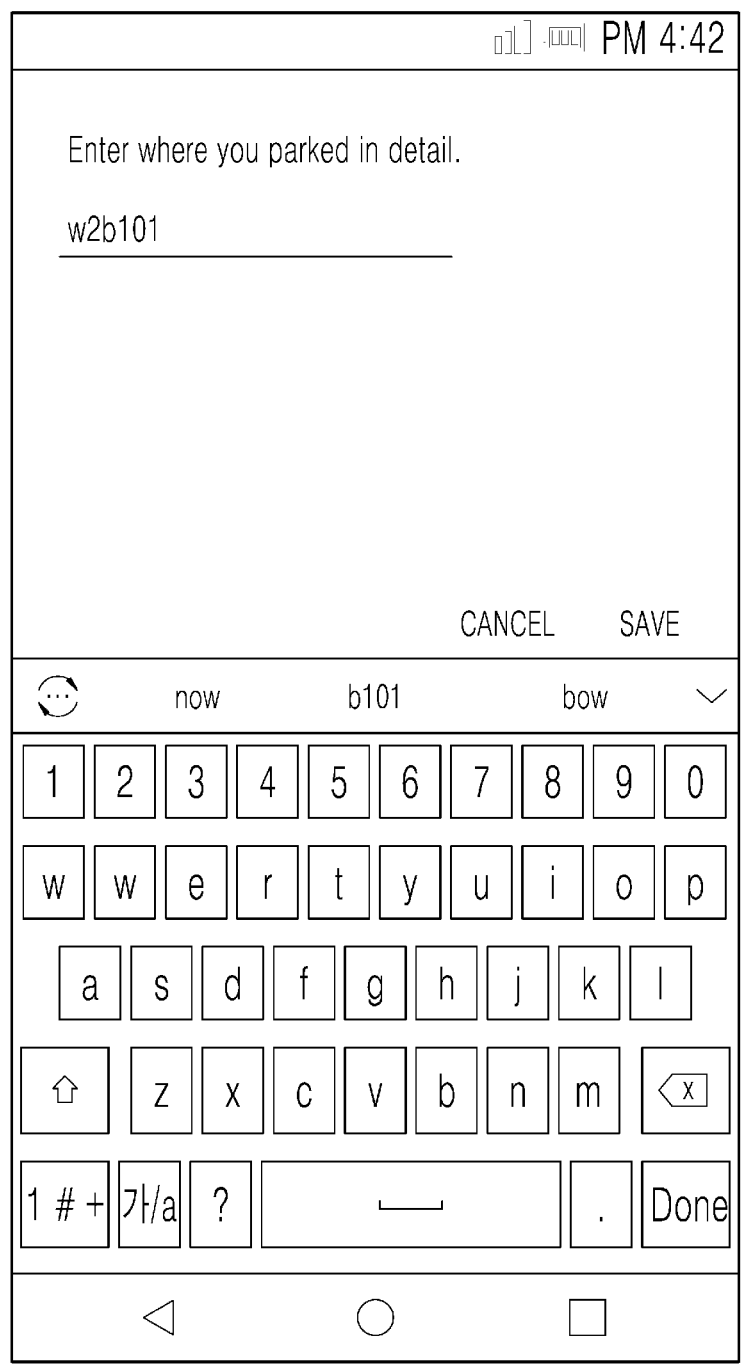

When the user pushes a microphone icon, it is possible to record the parking location by voice, and when the user pushes the keyboard button, a screen allowing input of characters may appear as illustrated in FIG. 8. Using the interface as illustrated in FIG. 8, the user may record the location of a place where the user has parked the vehicle, through a keyboard appearing on the screen.

Figure 9:
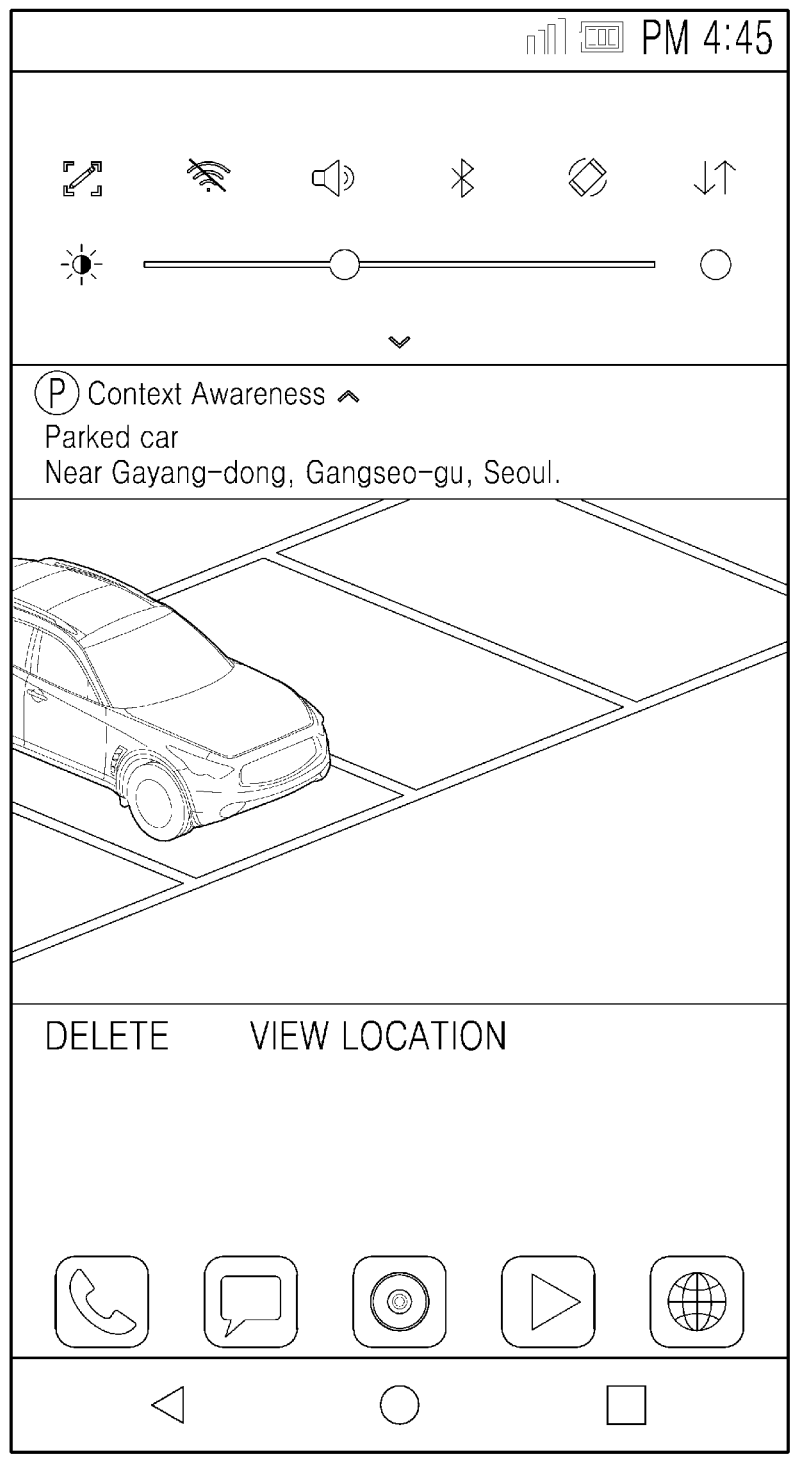

FIG. 9 illustrates a case where the user takes an image of the parking location, and when the user pushes a PHOTO button illustrated in FIG. 6 and then photographs the location of the vehicle 100, the user terminal 200 may generate a parking card together with information relating to a measured location.

Figure 10:

In the screen of FIG. 9, a VIEW LOCATION button enabling the user to identify the current location of the user terminal 200 through a map may be shown, and when the VIEW LOCATION button is pushed, the current location of the user terminal 200 is showed on a map as illustrated in FIG. 10, and information relating to the latitude, longitude, and location accuracy may be displayed.

When the user inputs parking information through interfaces as illustrated in FIGS. 6 to 10, the user terminal 200 may combine the input parking information with measured location information to generate a parking card showing the parking information input by the user and the measured location information.

As a case where the user ignores a request for inputting parking information, if there is no input after a request for input of parking location information, the user terminal 200 may generate a parking card by using only measured location information, after passage of a predetermined time from the request for input of the parking location information.

When the user parks the vehicle and then finishes his/her work, the user may identify the parking location of the user's vehicle by loading such a parking card in order to find the vehicle.

Figure 11:
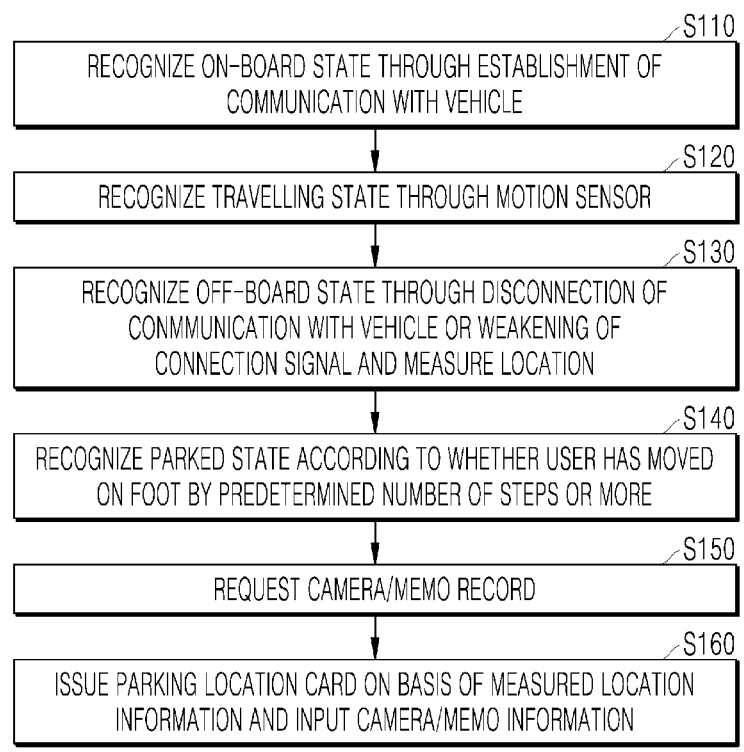
FIG. 11 is a flow chart of a method for recording a parking location according to an embodiment in the present disclosure.

FIG. 11 is a flow chart of a method for recording a parking location according to an embodiment in the present disclosure.

First, a user terminal 200 recognizes that a user is on-board a vehicle 100, through the establishment of a communication between the user terminal 200 and the vehicle 100 (S110). Then, when it is determined that the user is in the vehicle, which is traveling, through a motion sensor of the user terminal 200, it is determined that the user is in the traveling vehicle (S120).

In the most simple manner, when it is sensed through the motion sensor 250 of the user terminal 200 that the user terminal 200 is moved at a predetermined speed or higher or is moved at a predetermined acceleration or higher, it may be recognized that the user terminal 200 is in the traveling vehicle.

The motion sensor (250) may determine whether the user is in the traveling vehicle, by using an API, such as a Qualcomm CMC or Android AR.

After it is recognized that the vehicle 100 is in a traveling state, when the communication between the user terminal 200 and the vehicle 100 is disconnected or the strength of a communication connection signal is weakened to be equal to or lower than a predetermined level, the user terminal 200 recognizes a state where the user gets out of the vehicle 100 and measures the location of the user terminal 200 (S130).

When the user terminal 200 is in an indoor parking lot, more accurate location measurement using a GNSS signal is impossible. Therefore, a method for measuring the location through a different manner is required to be proposed, and the manner will be described in detail.

After the recognition of an off-board state, the user terminal 200 determines whether the user moves on foot, and when it is determined that the user has moved on foot by a predetermined number of steps of more, the user terminal recognizes that the vehicle 100 has entered a parked state (S140).

When the parked state is recognized, the user terminal 200 may request the user to input a camera or memo record through a user interface (S150).

When the user inputs parking information in response to the request, the user terminal 200 generates and issues a parking location card on the basis of camera or memo information input in operation S150, and location information decided through a measurement in operation S130 (S160).

Figure 12:
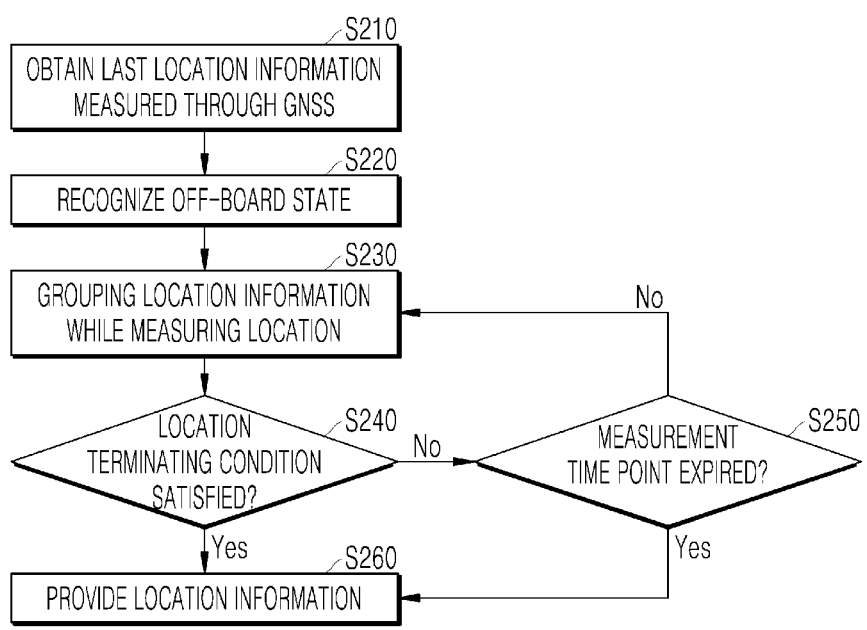
FIG. 12 is a flow chart of a method for providing decided parking location information of a vehicle according to an embodiment in the present disclosure.

FIG. 12 is a flow chart of a method for providing decided parking location information of a vehicle according to an embodiment in the present disclosure.

Figure 14:
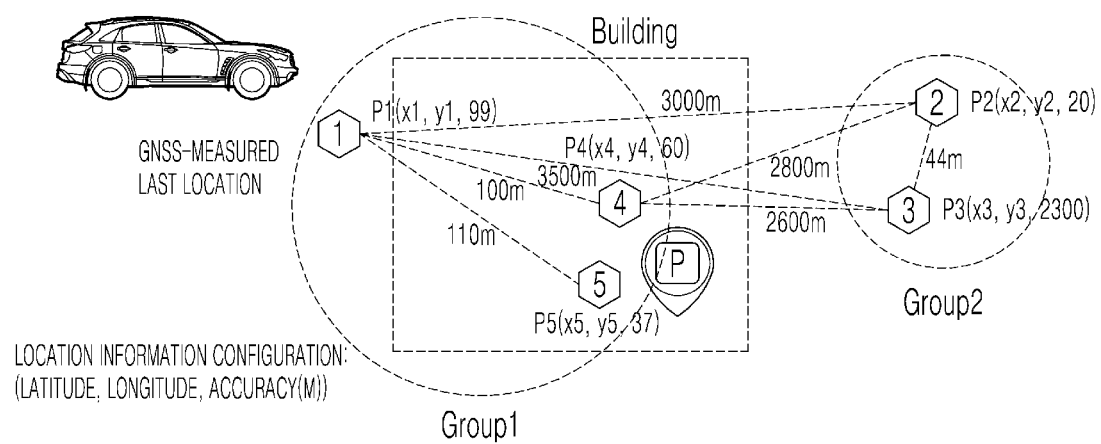
FIG. 14 is a diagram illustrating location information grouping performed according to the flow chart of FIG. 13.

The user terminal 200 obtains last location information measured through a GNSS before the vehicle enters a place, which is a GNSS signal shadow area, such as a parking building, as illustrated in FIG. 14 (S210).

Then, when an off-board state is recognized, a location measurement is performed by the user terminal 200 and location information is grouped (S230). The location measurement may be repeatedly performed periodically (for example, one time per minute) during a predetermined time from an off-board recognition time point (for example, during 15 minutes from an off-board recognition time point).

In the location measurement operation, location information of the user terminal 200 may be obtained using at least one of base station information relating to a base station connected to the terminal, WiFi network information relating to a WiFi network connected to the terminal, or GNSS signal information relating to a GNSS signal obtained by the terminal.

When multiple pieces of location information obtained through grouping satisfy a particular location terminating condition, decided location information is provided (S240 and S260). When the location terminating condition fails to be satisfied from a time point at which the off-board state is recognized, to a predetermined measurement time point, location information having the highest accuracy among pieces of location information obtained up to a corresponding time point is provided (S250).

Grouping of location information is a procedure for obtaining multiple pieces of location information and then grouping them to find more accurate location information, and will be described in detail later with reference to FIGS. 13 and 14.

As described in FIG. 14, location information lastly obtained immediately before the vehicle enters a parking building, which is a GNSS shadow area, is P1(x1, y1, 99). The expressed location information is (latitude, longitude, location accuracy), and the location accuracy corresponds to an error range of the location information, which is shown in a distance unit (m). That, P1 is a location, the latitude of which is x1, and the longitude of which is y1, and the error range is 99 m. Lastly obtained GNSS-measured location information may be referred to as first location information, and the first location information may be classified as a first group.

Figure 13:
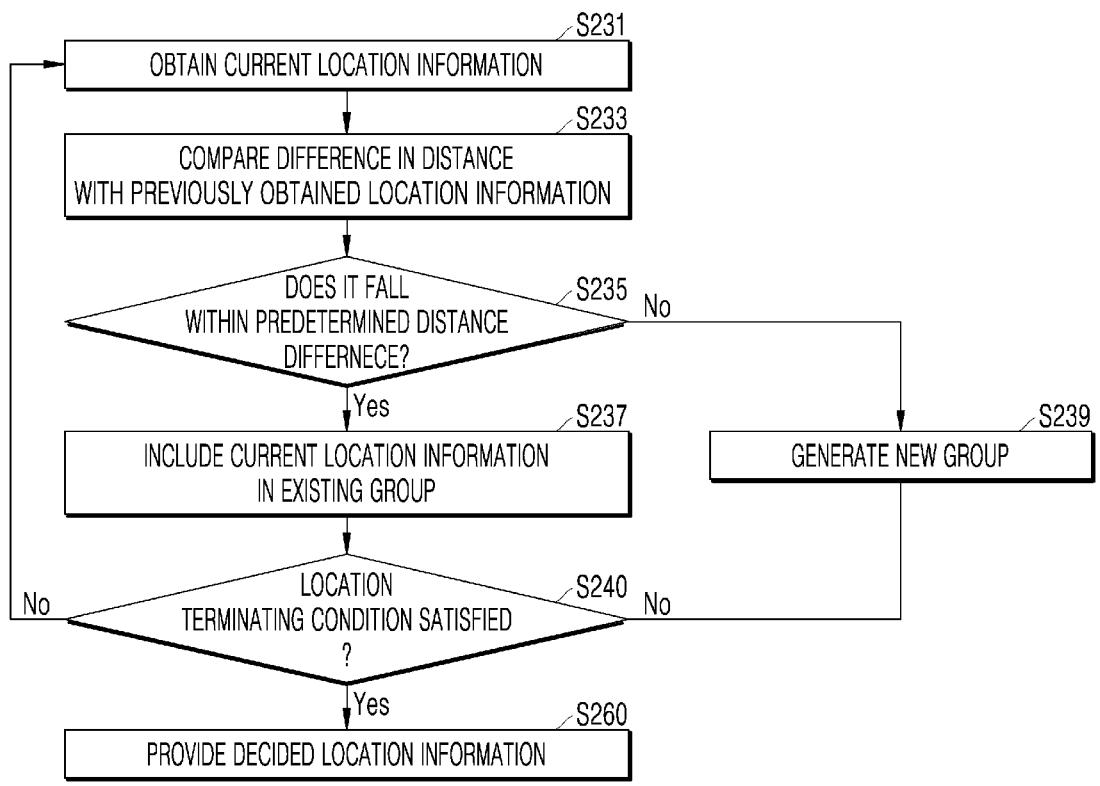
FIG. 13 is a flow chart of a method for grouping location information to provide decided parking location information of a vehicle according to an embodiment in the present disclosure.

After the vehicle enters the parking building and an off-board state is recognized, the user terminal 200 measures the current location and provides location information of P2(x2, y2, 20) (S231 of FIG. 13). P2 has a high location accuracy but is a location which is spaced 3000 m apart from P1 and has been abnormally measured.

In another embodiment of the present disclosure, location information indicating a location spaced a predetermined distance or greater (for example, 500 m) apart from the location of lastly obtained GNSS-measured location information is abnormal location information and may be excluded from location information for providing decided location information.

In an embodiment of the present disclosure described below, a grouping procedure is performed without excluding even abnormal location information as described above.

In a case where the distance between P1 and P2 is compared (S233), when the distance falls within a predetermined distance, P2 is included in the same group as P1, and when the distance is beyond the predetermined distance, a new group for P2 is generated (S235, S237, and S239).

In an embodiment of the present disclosure, when a standard for including in the same group is 300 m, the distance between P1 and P2 is 3000 m as illustrated in FIG. 14, and thus P2 is classified as a new second group, not the first group to which P1 belongs.

In an embodiment of the present disclosure, a location terminating condition is that there are three or more pieces of location information in the same group and there is location information having a location accuracy of 50 m or smaller in the corresponding group, and when the condition is satisfied, location information having the highest location accuracy (indicating the lowest value shown in unit m) in the corresponding group is provided as decided location.

Each of the first group and the new second group includes only one piece of location information. Therefore, the location terminating condition fails to be satisfied (S240), and current location information is obtained again (S231).

The re-obtained location information is P3(x3, y3, 2300). P3 has a location accuracy of 2300 m and thus the error range of the information is too large, and may be classified as inaccurate location information. For example, P3 may be measured on the basis of the location of the base station which the user terminal 200 communicates with.

In another embodiment of the present disclosure, when the location accuracy of location information is equal to or lower than a predetermined level (a value shown in unit m is equal to or more than a predetermined value, for example, 500 m or greater), the location information is inaccurate location information and may be excluded from location information for providing decided location information.

In an embodiment of the present disclosure described below, a grouping procedure is performed without excluding even inaccurate location information as described above.

P3 has a distance of 3500 m from P1 and has a distance of 44 m from P2, and thus belongs to the second group (S233, S235, and S237). The first group has one piece of location information and the second group has two pieces of location information, and thus the above location terminating condition fails to be satisfied (S240).

When current location information is obtained again, P4(x4, y4, 60) is obtained (S231). For example, P4 may be location information measured by a WiFi connection to an access point existing in the parking building, which is established while the user moves. P4 is 100 m far away from P1, is 2800 m far away from P2, and is 2600 m far away from P3 (S233). Therefore, P4 belongs to P1, which has a distance of 300 m or less from P4 (S235 and S237). The first group has two pieces of location information and the second group has two pieces of location information, and thus the above location terminating condition fails to be satisfied (S240).

When current location information is obtained again, P5(x5, y5, 37) is obtained (S231). For example, P5 may be location information measured when the user moves and becomes more closer to the access point existing in the parking building. P5 has a distance of 110 m from P1, and as shown in FIG. 14, it may be noted that P5 is 2600 m or greater far away from P2 and P3 and has a distance of 100 m or less from P4 (S233). Therefore, P5 belongs to the first group, which is the same group as P1 and P4 (S235 and S237). Accordingly, the first group has three pieces of location information and the second group has two pieces of location information. Therefore, a requirement relating to the number of pieces of location information belonging to one group, among the above location terminating condition, is satisfied.

In addition, the location accuracy of P5 is 37 m, which is smaller than 50 m. Therefore, a requirement relating to the location accuracy of at least one piece of location information in the group is also satisfied. Therefore, the location terminating condition is satisfied, and P5 having the highest location accuracy in the first group may be provided as decided location information.

As described above, until the location terminating condition is satisfied, the steps from S231 to S240 are repeatedly performed. When the location terminating condition is not satisfied after the location measurement is performed during a predetermined time (for example, 15 minutes) from the off-board recognition time point, information having the highest location accuracy among the pieces of location information obtained until the predetermined time has passed may be provided as decided location information.

The decided location information may be used to generate a parking information card by being combined with parking information input by the user as illustrated in FIG. 5.

Proposed may be a device, which can perform a method for recording a parking location as described above and is configured to record a parking location of a vehicle. Such a device may include: a motion sensor configured to sense movement of the device; a communication module configured to perform communication with an external device; a user interface configured to allow a user and the device to interact with each other; and a processor configured to interact with the motion sensor, the communication module, and the user interface.

The processor may be configured to perform the method according to the embodiments in the present disclosure as described above. For example, the processor may be configured to: A) when a communication is established between the communication module and the vehicle, recognize that the user gets in the vehicle; B) when the device moves at a predetermined speed or higher, recognize, by the motion sensor, that the vehicle starts to travel; C) when a strength of a communication connection signal between the communication module and the vehicle is lowered to be equal to or lower than a predetermined level, recognize that the user gets out of the vehicle; D) when it is determined by the motion sensor that the user carrying the device has moved on foot by a predetermined number of steps or more, recognize that parking of the vehicle is completed; E) request an input of parking information from the user through the user interface of the device; and F) after the parking information input request, generate a parking information card at least partially on the basis of the parking information input through the user interface.

The processor may be configured to perform E) and F) after all of A) to D) are completed in sequence, whereby a parked state requiring recording can be recognized more accurately.

In another embodiment of the present disclosure, provided may be a computer-readable recording medium in which at least a program configured to, when executed by a user terminal, cause the terminal to perform the method for recording a parking location according to the embodiments described in the present disclosure is recorded.

Although all the components constituting an embodiment of the disclosure have been described above as being combined into a single unit or combined to be operated as a single unit, the disclosure is not necessarily limited to such an embodiment, and one or more of all the components may be selectively combined and operated. Further, all components may be implemented in independent hardware, but some or all of the components may be selectively combined and implemented in computer programs which have a program module performing functions of some components or all components which are combined in one or more pieces of hardware. Codes and code segments forming the computer program can be easily conceived by an ordinarily skilled person in the technical field of the present disclosure. Such a computer program may implement the embodiments of the present disclosure by being stored in a computer readable storage medium, and being read and executed by a computer. Storage mediums such as a magnetic recording medium, an optical recording medium, and a semiconductor recording device may be employed as the storage medium of a computer program. Further, the computer program for implementing the embodiments of the disclosure includes a program module which is transmitted through an external device.

The embodiments of the present disclosure have been illustrated, but various changes and modifications would be applied thereto by a person skilled in the art. Therefore, it may be understood that the changes and modifications are included in the range of the present disclosure unless departing from the scope of the present disclosure.

What is claimed is:

1. A method for recording a parking location of a vehicle, the method performed by a user terminal and comprising:
when a communication connection is established between the user terminal and the vehicle, recognizing that a user enters the vehicle;
recognizing, by a motion sensor of the user terminal, that the vehicle, into which the user has entered, starts to travel;
when a strength of a communication connection signal between the user terminal and the vehicle drops to a predetermined level or less, recognizing that the user exits the vehicle;
after recognizing that the user exits the vehicle, measuring a current location of the user terminal to determine location information of the user terminal;
when it is determined by the motion sensor of the user terminal that the user has moved a predetermined number of walking steps or more, recognizing that parking of the vehicle is completed;
when it is recognized that the parking of the vehicle is completed, requesting an input of parking information from the user through a user interface of the user terminal; and
generating a parking information card based at least in part on the parking information from the user and on the determined location information,
wherein the location information comprises location accuracy, the location accuracy indicating an error range of the location information with a distance unit, and
wherein, when the location accuracy of the location information is equal to or greater than a predetermined distance value, the corresponding location information is determined as an inaccurate location and is excluded from the determined location information.

2. The method of claim 1, wherein measuring the current location of the user terminal is repeatedly performed at a predetermined interval within a predetermined time range after recognizing that the user exits the vehicle.

3. The method of claim 1, wherein the location information of the user terminal is determined using at least one of base station information relating to a base station connected to the user terminal, WiFi network information relating to a WiFi network connected to the user terminal, or GNSS (Global Navigation Satellite System) signal information relating to a GNSS signal obtained by the user terminal.

4. The method of claim 1, wherein the location information further comprises latitude and longitude.

5. The method of claim 1, further comprising:
after recognizing that the vehicle starts to travel and before recognizing that the user exits the vehicle, obtaining first location information, which is a last GNSS (Global Navigation Satellite System) location information before the user exits the vehicle, based on a GNSS signal lastly obtained by the user terminal,
wherein measuring the current location of the user terminal comprises:
obtaining current location information of the user terminal after recognizing that the user exits the vehicle; and
determining the current location information as an abnormal location when a distance from a current location to a first location of the first location information is equal to or greater than a predetermined value, by comparing the current location information and the first location information.

6. The method of claim 1, further comprising:
after recognizing that the vehicle starts to travel and before recognizing that the user exits the vehicle, obtaining first location information, which is a last GNSS (Global Navigation Satellite System) location information before the user exits the vehicle, based on a GNSS signal lastly obtained by the user terminal,
wherein measuring the current location of the user terminal comprises:
a) generating a first group comprising the first location information;
b) obtaining current location information of the user terminal after recognizing that the user exits the vehicle;
c) calculating distances from a current location to a plurality of existing locations by comparing the current location information with existing location information, the existing location information including the first location information and information about locations of the terminal that were measured after recognizing that the user exits the vehicle;
d) when a smallest value among values of the calculated distances from the current location to the existing locations is greater than a pre-configured value, generating a new group comprising the current location information, or when a smallest value among the values of the calculated distances from the current location to the existing locations falls within a pre-configured range, including the current location information in a closest group to which a closest existing location, which is closest to the current location, belongs; and
e) terminating the measurement of the current location and providing, as the determined location information, location information having a highest accuracy among locations included in the closest group when a number of locations included in the closest group is equal to or greater than a predetermined number and an accuracy of at least one location among the locations included in the closest group is equal to or greater than a predetermined level, and, otherwise, repeating b), c) and d).

7. A computer-readable recording medium storing one or more instructions that, when executed by a user terminal, cause the user terminal to:
when a communication connection is established between the user terminal and a vehicle, recognize that a user enters the vehicle;
recognize, by a motion sensor of the user terminal, that the vehicle, into which the user has entered, starts to travel;
when a strength of a communication connection signal between the user terminal and the vehicle drops to a predetermined level or less, recognize that the user exits the vehicle;
after recognizing that the user exits the vehicle, measure a current location of the user terminal to determine location information of the user terminal;
when it is determined by the motion sensor of the user terminal that the user has moved a predetermined number of walking steps or more, recognize that parking of the vehicle is completed;
when it is recognized that the parking of the vehicle is completed, request an input of parking information from the user through a user interface of the user terminal; and generate a parking information card based at least in part on the parking information from the user and on the determined location information, wherein the location information comprises location accuracy, the location accuracy indicating an error range of the location information with a distance unit, and wherein, when the location accuracy of the location information is equal to or greater than a predetermined distance value, the corresponding location information is determined as an inaccurate location and is excluded from the determined location information.

8. A device configured to record a parking location of a vehicle, the device comprising:
   a motion sensor configured to sense movement of the device;
   a communication module configured to perform communication with an external device;
   a user interface configured to allow a user and the device to interact with each other; and
   one or more processors configured to interact with the motion sensor, the communication module, and the user interface,
   wherein the one or more processors are configured to:
   when a communication is established between the communication module and the vehicle, recognize that the user enters the vehicle;
   when the device moves at a predetermined speed or higher, recognize, by the motion sensor, that the vehicle starts to travel;
   when a strength of a communication connection signal between the communication module and the vehicle drops to a predetermined level or less, recognize that the user exits the vehicle;
   after recognizing that the user exits the vehicle, measure a current location of the device to determine location information of the device;
   when it is determined by the motion sensor that the user carrying the device has moved a predetermined number of walking steps or more, recognize that parking of the vehicle is completed;
   request an input of parking information from the user through the user interface; and
   generate a parking information card based at least partially on the parking information from the user and on the determined location information,
   wherein the location information comprises location accuracy, the location accuracy indicating an error range of the location information with a distance unit, and
   wherein, when the location accuracy of the location information is equal to or greater than a predetermined distance value, the corresponding location information is determined as an inaccurate location and is excluded from the determined location information.

9. The device of claim 8, wherein the one or more processors are configured to request the input of the parking information and generate the parking information card after recognizing that the user enters the vehicle, recognizing that the vehicle starts to travel, recognizing that the user exits the vehicle, and recognizing that the parking of the vehicle is completed are performed in sequence.

10. The device of claim 9, wherein the one or more processors are further configured to repeatedly measure the current location of the device at a predetermined interval within a predetermined range of time after recognizing that the user exits the vehicle.

11. The device of claim 9, wherein the communication module comprises a GNSS (Global Navigation Satellite System) module, and the location information of the device is determined using at least one of base station information relating to a base station connected to the device, WiFi network information relating to a WiFi network connected to the device, or GNSS signal information relating to a GNSS signal obtained by the device.

12. The device of claim 9, wherein the location information further comprises latitude and longitude.

13. The device of claim 9, wherein the communication module comprises a GNSS (Global Navigation Satellite System) module, and
   the one or more processors are further configured to,
   after recognizing that the vehicle starts to travel and before recognizing that the user exits the vehicle, obtain first location information, which is a last GNSS location information before the user exits the vehicle, based on a GNSS signal lastly obtained by the device, and
   the one or more processors measure the current location of the device by:
   obtaining current location information of the device after recognizing that the user exits the vehicle; and
   determining the current location information as an abnormal location when a distance from a current location to a first location of the first location information is equal to or greater than a predetermined value, by comparing the current location information and the first location information.

14. The device of claim 8, wherein the communication module comprises a GNSS (Global Navigation Satellite System) module, and
   the one or more processors are further configured to,
   after recognizing that the vehicle starts to travel and before recognizing that the user exits the vehicle, obtain first location information, which is a last GNSS location information before the user exits the vehicle, based on a GNSS signal lastly obtained by the device, and
   the one or more processors measure the current location of the device by:
   a) generating a first group comprising the first location information;
   b) obtaining current location information of the device after recognizing that the user exits the vehicle;
   c) calculating distances from a current location to a plurality of existing locations by comparing the current location information and existing location information, the existing location information including the first location information and information about locations of the device measured after recognizing that the user exits the vehicle;
   d) when a smallest value among values of the calculated distances from the current location to the existing locations is greater than a pre-configured value, generating a new group comprising the current location information, or when a smallest value among the values of the calculated distances from the current location to the existing locations falls within a pre-configured range, including the current location information in a closest group to which a closest existing location, which is closest to the current location, belongs; and
   e) terminating the measurement of the current location and providing, as the determined location information, location information having a highest accuracy among locations included in the closest group when a number of locations included in the closest group is equal to or greater than a predetermined number, and an accuracy of at least one location among the locations included in the closest group is equal to or greater than a predetermined level, and, otherwise, repeating b), c) and d).

15. A method for recording a parking location of a vehicle, the method performed by a user terminal and comprising:
when a communication connection is established between the user terminal and the vehicle, recognizing that a user enters the vehicle;
recognizing, by a motion sensor of the user terminal, that the vehicle, into which the user has entered, starts to travel;
obtaining first location information, which is a last GNSS (Global Navigation Satellite System) location information before the user exits the vehicle, based on a GNSS signal lastly obtained by the user terminal;
when a strength of a communication connection signal between the user terminal and the vehicle drops to a predetermined level or less, recognizing that the user exits the vehicle;
after recognizing that the user exits the vehicle, measuring a current location of the user terminal to determine location information of the user terminal;
when it is determined by the motion sensor of the user terminal that the user has moved a predetermined number of walking steps or more, recognizing that parking of the vehicle is completed;
when it is recognized that the parking of the vehicle is completed, requesting an input of parking information from the user through a user interface of the user terminal; and
generating a parking information card based at least in part on the parking information from the user and on the determined location information,
wherein measuring the current location of the user terminal comprises:
a) generating a first group comprising the first location information;
b) obtaining current location information of the user terminal after recognizing that the user exits the vehicle;
c) calculating distances from a current location to a plurality of existing locations by comparing the current location information with existing location information, the existing location information including the first location information and information about locations of the terminal that were measured after recognizing that the user exits the vehicle;
d) when a smallest value among values of the calculated distances from the current location to the existing locations is greater than a pre-configured value, generating a new group comprising the current location information, or when a smallest value among the values of the calculated distances from the current location to the existing locations falls within a pre-configured range, including the current location information in a closest group to which a closest existing location, which is closest to the current location, belongs; and
e) terminating the measurement of the current location and providing, as the determined location information, location information having a highest accuracy among locations included in the closest group when a number of locations included in the closest group is equal to or greater than a predetermined number and an accuracy of at least one location among the locations included in the closest group is equal to or greater than a predetermined level, and, otherwise, repeating b), c) and d).

16. A device configured to record a parking location of a vehicle, the device comprising:
a motion sensor configured to sense movement of the device;
a communication module configured to perform communication with an external device;
a user interface configured to allow a user and the device to interact with each other; and
one or more processors configured to interact with the motion sensor, the communication module, and the user interface,
wherein the one or more processors are configured to:
when a communication is established between the communication module and the vehicle, recognize that the user enters the vehicle;
when the device moves at a predetermined speed or higher, recognize, by the motion sensor, that the vehicle starts to travel;
when a strength of a communication connection signal between the communication module and the vehicle drops to a predetermined level or less, recognize that the user exits the vehicle;
after recognizing that the user exits the vehicle, measure a current location of the device to determine location information of the device;
when it is determined by the motion sensor that the user carrying the device has moved a predetermined number of walking steps or more, recognize that parking of the vehicle is completed;
request an input of parking information from the user through the user interface; and
generate a parking information card based at least partially on the parking information from the user and on the determined location information,
wherein the communication module comprises a GNSS (Global Navigation Satellite System) module, and
the one or more processors are further configured to,
after recognizing that the vehicle starts to travel and before recognizing that the user exits the vehicle, obtain first location information, which is a last GNSS location information before the user exits the vehicle, based on a GNSS signal lastly obtained by the device, and
the one or more processors measure the current location of the device by:
a) generating a first group comprising the first location information;
b) obtaining current location information of the device after recognizing that the user exits the vehicle;
c) calculating distances from a current location to a plurality of existing locations by comparing the current location information and existing location information, the existing location information including the first location information and information about locations of the device measured after recognizing that the user exits the vehicle;
d) when a smallest value among values of the calculated distances from the current location to the existing locations is greater than a pre-configured value, generating a new group comprising the current location information, or when a smallest value among the values of the calculated distances from the current location to the existing locations falls within a pre-configured range, including the current location information in a closest group to which a closest existing location, which is closest to the current location, belongs; and e) terminating the measurement of the current location and providing, as the determined location information, location information having a highest accuracy among locations included in the closest group when a number of locations included in the closest group is equal to or greater than a predetermined number, and an accuracy of at least one location among the locations included in the closest group is equal to or greater than a predetermined level, and, otherwise, repeating b), c) and d).

\* \* \* \* \*